United States Patent
Miyashita et al.

(10) Patent No.: US 9,250,791 B2
(45) Date of Patent: Feb. 2, 2016

(54) DISPLAY CONTROL DEVICE, DISPLAY CONTROL METHOD, AND COMPUTER PROGRAM

(75) Inventors: Ken Miyashita, Tokyo (JP); Tatsushi Nashida, Kanagawa (JP)

(73) Assignee: Sony Corporation, Tokyo (JP)

( * ) Notice: Subject to any disclaimer, the term of this patent is extended or adjusted under 35 U.S.C. 154(b) by 682 days.

(21) Appl. No.: 13/386,376

(22) PCT Filed: May 13, 2010

(86) PCT No.: PCT/JP2010/058111
§ 371 (c)(1),
(2), (4) Date: Jan. 20, 2012

(87) PCT Pub. No.: WO2011/013431
PCT Pub. Date: Feb. 3, 2011

(65) Prior Publication Data
US 2012/0127107 A1    May 24, 2012

(30) Foreign Application Priority Data

Jul. 28, 2009    (JP) ................ P2009-175482

(51) Int. Cl.
*G06F 3/041*    (2006.01)
*G06F 3/0488*   (2013.01)
*G06F 3/0484*   (2013.01)
*G06F 3/0485*   (2013.01)

(52) U.S. Cl.
CPC .......... *G06F 3/0488* (2013.01); *G06F 3/04883* (2013.01); *G06F 3/041* (2013.01); *G06F 3/0485* (2013.01); *G06F 3/04847* (2013.01); *G06F 2203/04806* (2013.01)

(58) Field of Classification Search
USPC .................................. 345/173-178
See application file for complete search history.

(56) References Cited

U.S. PATENT DOCUMENTS

| | | | | |
|---|---|---|---|---|
| 5,615,384 A * | 3/1997 | Allard et al. | ................... | 715/800 |
| 2003/0076301 A1 * | 4/2003 | Tsuk et al. | ...................... | 345/159 |
| 2004/0160458 A1 * | 8/2004 | Igarashi et al. | ................ | 345/660 |
| 2006/0284858 A1 * | 12/2006 | Rekimoto | ...................... | 345/173 |
| 2009/0046110 A1 * | 2/2009 | Sadler et al. | ................... | 345/660 |

* cited by examiner

Primary Examiner — Jason Olson
Assistant Examiner — Sosina Abebe
(74) Attorney, Agent, or Firm — Paratus Law Group, PLLC

(57) ABSTRACT

A display control device according to the present invention includes a detection unit for detecting contact of an operating object on a display surface of a display unit, a position calculation unit for calculating a contact position, on the display surface, of the operating object whose contact has been detected by the detection unit, an operation process determination unit for determining, from a plurality of operation processes associated with a motion of the operating object, one operation process to be performed, according to a length of a contact time of continuously contacting the display surface within a first area including a reference contact position which is a contact position of the operating object at a time of the operating object being made to contact the display surface after a state of separation from the display surface, and an operation processing unit for changing display of the display unit by the operation process that is performed, based on a motion of the operating object that is further continuously in contact with the display surface.

10 Claims, 10 Drawing Sheets

DISPLAY CONTROL DEVICE, DISPLAY CONTROL METHOD, AND COMPUTER PROGRAM

TECHNICAL FIELD

The present invention relates to a display control device, a display control method, and a computer program, and more particularly, relates to a display control device, a display control method and a computer program for performing display control based on an operation of an operating object performed on a touch panel.

BACKGROUND ART

In recent years, a UI (User Interface) that uses a touch panel is becoming widespread as means for enabling anyone to easily perform an input/output operation of information. For example, by performing a gesture of screen scrolling by directly dragging the screen, an operation process associated with the gesture can be performed. By associating a gesture with an operation process that is easily and intuitively imagined by a user from the gesture, an input operation by the gesture can be facilitated.

For example, in Patent Literature 1, an input device is disclosed that performs input processes that are based on a plurality of different input modes, according to the degree of pressing or the state of sliding of an operating object such as a finger with respect to a display screen. By using such an input device, a user is allowed to change the motion of a finger on the display screen to thereby cause an input process corresponding to each motion to be performed. As a gesture performed by a user in a state where a finger is in contact with the screen, there is a drag operation of moving the finger up or down or left or right on the screen, for example. An operation of performing screen scrolling or an operation of changing the zoom rate of an image displayed on the screen may be associated with the drag operation, for example.

CITATION LIST

Patent Literature

Patent Literature 1: JP 2009-20759A

SUMMARY OF INVENTION

Technical Problem

However, generally, only one operation process can be associated with one gesture. For example, in the case the drag operation of a finger on a screen is assigned to the screen scroll operation, the drag operation of a finger cannot be assigned to the operation of changing a zoom rate. In such a case, a slider 14 for changing the zoom rate has to be Internet-displayed on a screen 12 of a mobile device 10, as shown in FIG. 11, for example. Accordingly, there is a problem that the image display area becomes small on the screen 12.

Furthermore, in the case the drag operation of a finger on a screen is assigned to the screen scroll operation, it is conceivable to assign the operation of changing the zoom rate to another gesture. For example, it is assumed that a gesture of pinch in or pinch out of bringing two fingers closer or spreading them apart is assigned to the operation of changing the zoom rate. In this case, the above-described problem that the image display area becomes small is solved, but an operation using two fingers becomes necessary, and thus performing an operation while holding a mobile device with one hand is difficult.

The present invention is made in view of the above problem, and the object of the present invention is to provide a display control device, an operation control method, and a computer program which are novel and improved, and which are capable of enabling an operation process to be smoothly performed with one hand.

Solution to Problem

According to an aspect of the present invention, in order to achieve the above-mentioned object, there is provided a display control device including a detection unit for detecting contact of an operating object on a display surface of a display unit, a position calculation unit for calculating a contact position, on the display surface, of the operating object whose contact has been detected by the detection unit, an operation process determination unit for determining, from a plurality of operation processes associated with a motion of the operating object, one operation process to be performed, according to a length of a contact time of continuously contacting the display surface within a first area including a reference contact position which is a contact position of the operating object at a time of the operating object being made to contact the display surface after a state of separation from the display surface, and an operation processing unit for changing display of the display unit by the operation process that is performed, based on a motion of the operating object that is further continuously in contact with the display surface.

According to the present invention, one operation process to be performed is determined from a plurality of operation processes associated with a predetermined motion of the operating object, based on a motion of the operating object that is in contact with the display surface. When the operation process to be performed is determined, the operation processing unit changes display of the display unit by the operation process that is performed, based on a motion of the operating object that is still in contact with the display surface. In this manner, an operation process to be performed can be determined from a series of motions of the operating object that is in contact with the display surface, and further, the amount of operation on an operation target can be determined.

Here, the operation processing unit is capable of including a scroll processing unit for scrolling a screen displayed on the display unit according to a movement of the contact position of the operating object on the display surface, and a level-of-detail processing unit for changing a level of detail of display content displayed on the display unit according to a movement of the contact position of the operating object on the display surface. At this time, in a case of determining that the contact time of the operating object within the first area has exceeded a threshold time, the operation process determination unit is capable of causing the level-of-detail processing unit to function.

Also, in a case of determining that the contact position of the operating object is positioned outside the first area, the operation process determination unit may cause the scroll processing unit to function.

Furthermore, the detection unit is allowed to be configured to be capable of detecting a pressure imposed by the operating object on the display surface. At this time, in a case the detected pressure is higher than a threshold pressure, the operation process determination unit may cause the level-of-detail processing unit to function.

In a case the contact time of the operating object within the first area does not exceed the threshold time and the detected pressure is not higher than the threshold pressure, the operation process determination unit may cause the scroll processing unit to function.

Furthermore, the position calculation unit calculates a position on the display surface with respect to the first area and a second area provided adjacent to the first area in a movable direction of the operating object. At this time, the level-of-detail processing unit may change the level of detail of the display content according to which area of the first area or the second area the contact position of the operating object is positioned in. For example, the level-of-detail processing unit may increase the level of detail of the display content in a case the operating object is positioned within the first area, and decrease the level of detail of the display content in a case the operating object is positioned within the second area.

Furthermore, after one operation process to be performed is decided by the operation process determination unit, the operation processing unit changes display of the display unit by the operation process that is performed, based on a motion of the operating object, until separation of the operating object from the display surface is detected by the detection unit.

According to another aspect of the present invention, in order to achieve the above-mentioned object, there is provided a display control device including a detection unit for detecting contact of an operating object on a display surface of a display unit, a position calculation unit for calculating a contact position, on the display surface, of the operating object whose contact has been detected by the detection unit, an operation process determination unit for determining, from a plurality of operation processes associated with a motion of the operating object, one operation process to be performed, according to a magnitude of a pressure of the operating object on the display surface within a first area including a reference contact position which is a contact position of the operating object at a time of the operating object being made to contact the display surface after a state of separation from the display surface, and an operation processing unit for changing display of the display unit by the operation process that is performed, based on a motion of the operating object that is further continuously in contact with the display surface.

According to another aspect of the present invention, in order to achieve the above-mentioned object, there is provided a display control method comprising the steps of detecting, by a detection unit, contact of an operating object on a display surface of a display unit, calculating a contact position, on the display surface, of the operating object whose contact has been detected by the detection unit, determining, from a plurality of operation processes associated with a motion of the operating object, one operation process to be performed, according to a length of a contact time of continuously contacting the display surface within a first area including a reference contact position which is a contact position of the operating object at a time of the operating object being made to contact the display surface after a state of separation from the display surface, and changing display of the display unit by the operation process that is performed, based on a motion of the operating object that is further continuously in contact with the display surface.

According to another aspect of the present invention, in order to achieve the above-mentioned object, there is provided a computer program for causing a computer to function as the display control device described above. The computer program causes a computer to function as the display control device described above by being stored in a storage device provided in the computer and by being read and executed by a CPU provided in the computer. Furthermore, a computer-readable recording medium on which the computer program is recorded. The recording medium is a magnetic disk, an optical disk, or the like, for example.

Advantageous Effects of Invention

According to the present invention, a display control device, an operation control method, and a computer program which are capable of enabling an operation process to be smoothly performed with one hand can be provided.

REFERENCE SIGNS LIST

Figure 1:
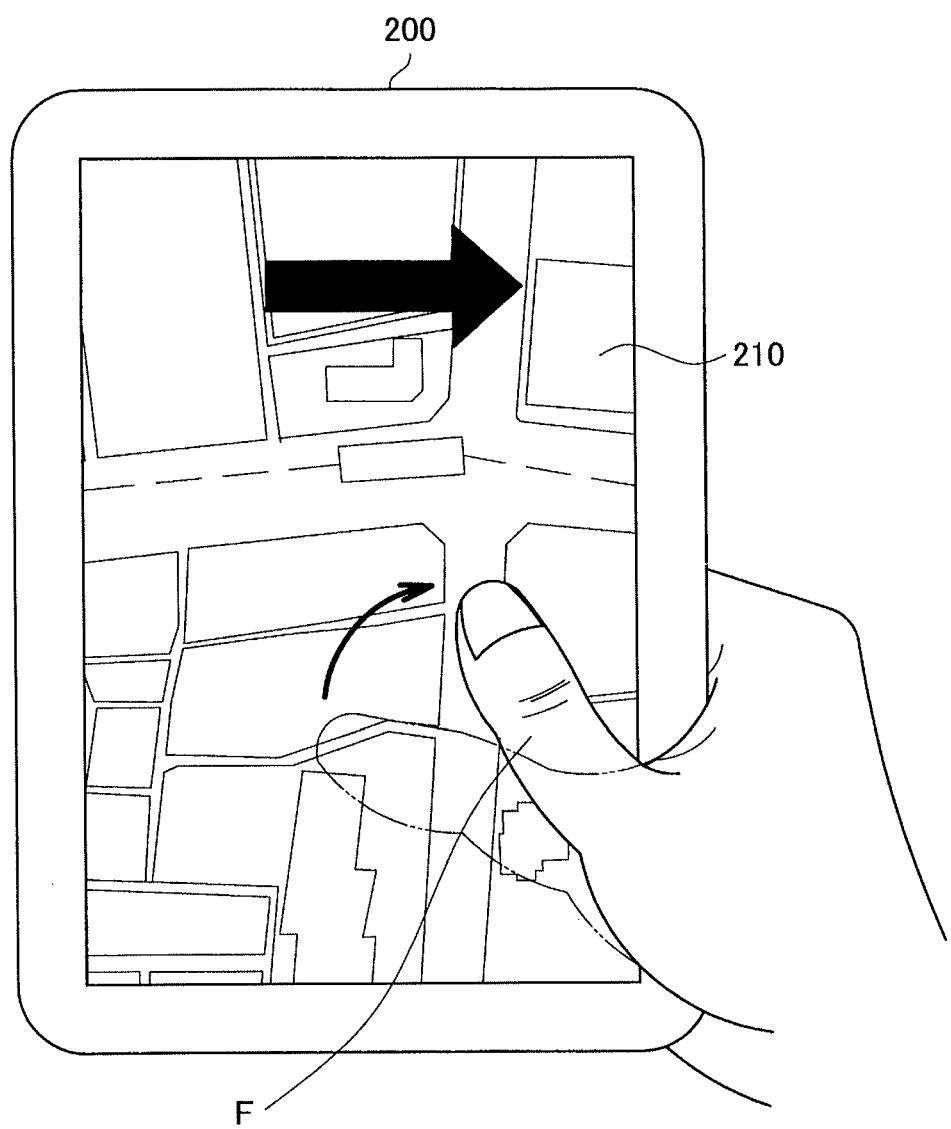
FIG. 1 is an explanatory diagram showing an operation state of a user and a display state of a screen at the time of a screen scroll process being performed by a display control device according to a first embodiment of the present invention.

100 Display control device
110 Detection unit
120 Mode-switch determination unit
130 Position calculation unit
140 Timer unit
150 Scroll processing unit
160 Zoom processing unit
170 Display unit
180 Storage unit
210 Display surface
310 Near area
320 Far area

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Additionally, an explanation will be given in the following order.

1. First Embodiment (Display Control: Mode Switching, Zoom Rate Change Process based on Contact Time)
2. Second Embodiment (Display Control: Mode Switching based on Contact Time and Pressure)
3. Explanation on Hardware Configuration

1. First Embodiment

Overview of Display Control

Figure 2:
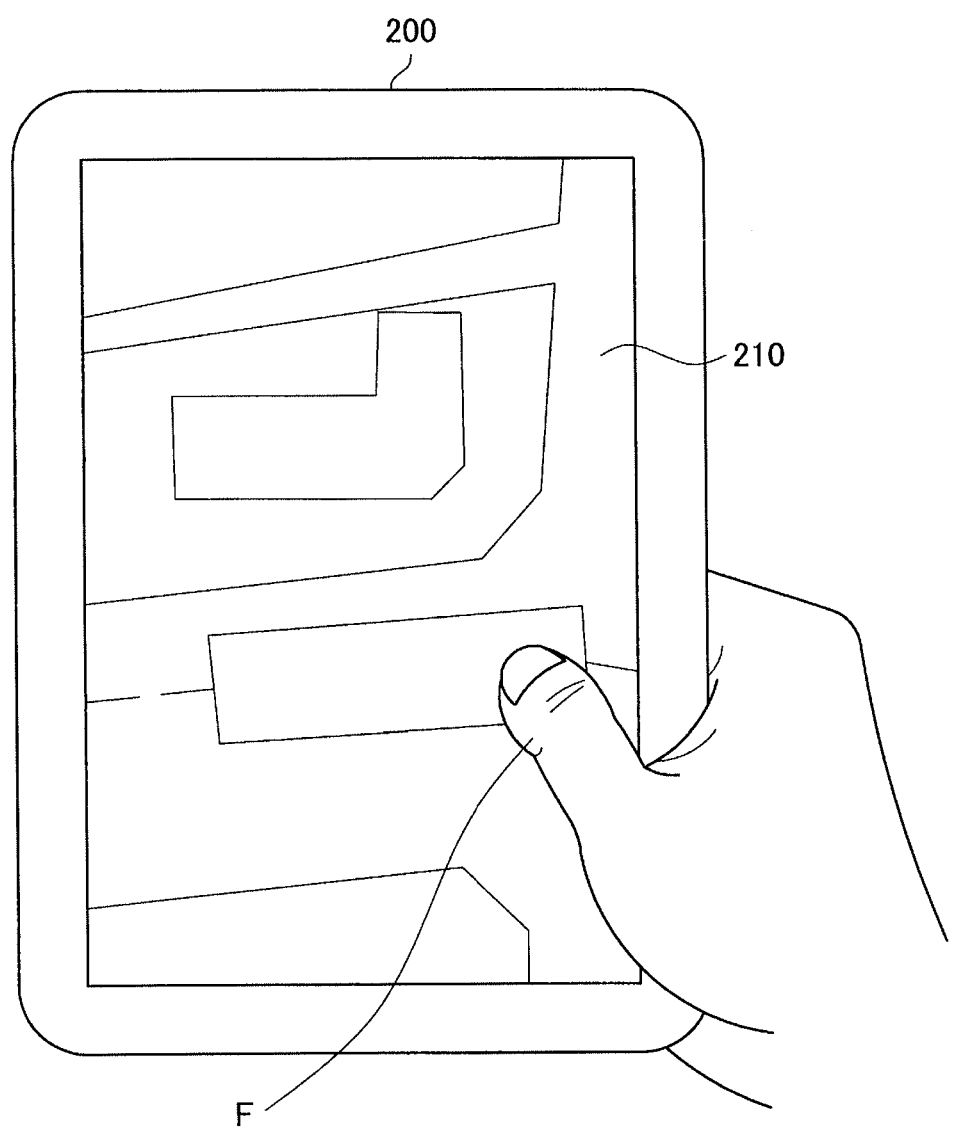
FIG. 2 is an explanatory diagram showing an operation state of a user and a display state of a screen at the time of a zoom rate change process being performed by the display control device according to the embodiment.

First, display processing of a screen controlled by a display control device according to an embodiment of the present invention will be described based on FIG. 1 and FIG. 2. Additionally, FIG. 1 is an explanatory diagram showing an operation state of a user and a display state of a screen at the time of a screen scroll process being performed by a display control device according to the present embodiment. FIG. 2 is an explanatory diagram showing an operation state of a user and a display state of a screen at the time of a zoom rate change process being performed by the display control device according to the present embodiment.

In the present embodiment, an explanation will be given on a display control device that performs, in a mobile device 200 as shown in FIG. 1, an operation process that is associated with a movement of an operating object by causing the operating object to move on a screen by a hand holding the mobile device 200. The mobile device 200 includes a detection unit for detecting whether an operating object has contacted a display surface 210 or not, and is capable of analyzing, from a detection value of the detection unit, the movement of the operating object on the screen. In the present embodiment, a scroll operation of a screen can be performed by a movement of a finger F, which is the operating object, of dragging the finger F up or down or left or right on the display surface 210, and a zoom rate change operation for a display image can be performed by a movement of the finger F of moving the contact position of the finger. The display control device estimates, based on the motion or the contact position of the finger F, which operation of the scroll operation of a screen and the zoom rate change operation for a display image a user is performing, and performs the estimated operation process based on the motion of the finger F. In the following, the contact position of the finger is assumed to indicate a barycentric position in a contact area where the finger is contacting the display surface.

Specifically, as shown in FIG. 1, in the case the finger F that is in contact with the display surface 210 is greatly moved, the display control device performs the scroll process of the screen. When the finger F is dragged in a horizontal direction in a state where the finger F is in contact with the display surface 210, the image displayed on the display surface 210 is scrolled in the horizontal direction, and when the finger F is dragged in a vertical direction, the image displayed on the display surface 210 is scrolled in the vertical direction. On the other hand, as shown in FIG. 2, a user can perform the zoom rate change process for the display image by moving the finger F by pressing the finger F into the display surface 210 or tilting the finger F.

On detecting that the contact position of the finger F has been positioned in a predetermined area for more than a predetermined time since the contact of the finger F with the display surface 210, the display control device of the present embodiment switches the operation process performed by a drag operation of the finger F from the screen scroll process to the zoom rate change process. An operation process to be performed can be thereby easily switched even if different operation processes are associated with one movement of the operating object. Particularly, by providing the display control device according to the present embodiment in the mobile device 200 as shown in FIG. 1 and FIG. 2, a user can perform screen scrolling and changing of the zoom rate of a display image by one-finger operation while in a state of holding the mobile device 200 with one hand. In the following, the display control device according to the present embodiment and a display control method using the same will be described in detail based on FIGS. 3 to 8.

[Functional Configuration of Display Control Device]

Figure 3:
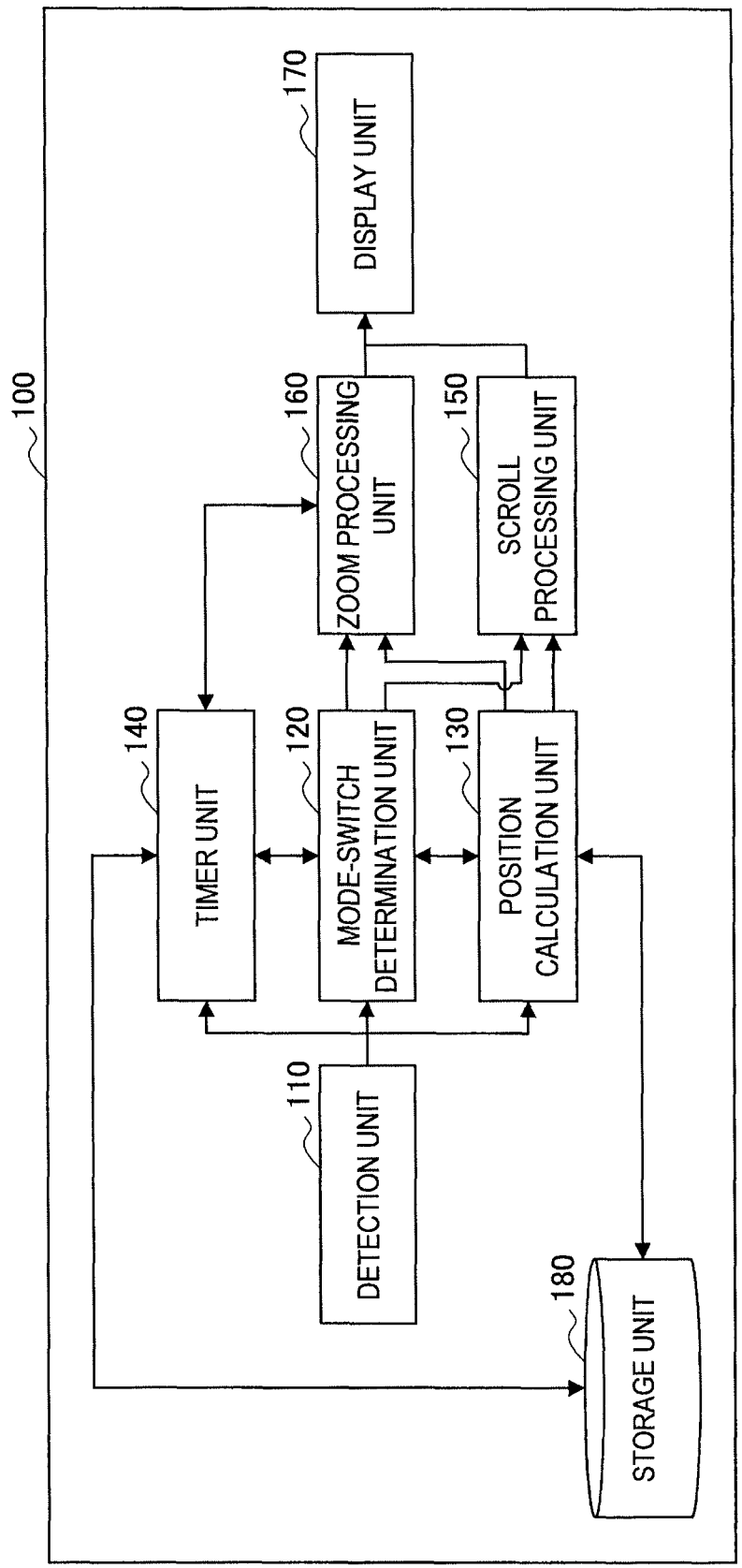
FIG. 3 is a functional block diagram showing a configuration of the display control device according to the embodiment.

First, a functional configuration of a display control device 100 according to the present embodiment will be described based on FIG. 3. Additionally, FIG. 3 is a functional block diagram showing a configuration of the display control device 100 according to the present embodiment. The display control device 100 according to the present embodiment includes a detection unit 110, a mode-switch determination unit 120, a position calculation unit 130, a timer unit 140, a scroll processing unit 150, a zoom processing unit 160, a display unit 170, and a storage unit 180.

The detection unit 110 determines whether an operating object has contacted the display surface 210 or not. A touch panel, for example, can be used as the detection unit 110, and configuration is possible using a sensor for detecting a change in the capacitance, a sensor for detecting a pressure on the display unit 170, an optical sensor for detecting proximity of an operating object by detecting a change in the amount of light (thickness of a shadow), or the like. The detection unit 110 detects the capacitance, the pressure, the amount of light, or the like, detected by the corresponding method as the detection value. Another function unit can determine contact or proximity of an operating object to the display surface 210 based on the magnitude or a change in the detection value of the detection unit 110. In the present embodiment, a pressure-sensitive touch panel is used that detects an input by having, for example, films or pieces of glass on which transparent conductive films (ITO) are provided joined with each other with the transparent conductive films facing each other and with the transparent conductive films contacting each other at the time of pressing down by the operating object. The detection unit 110 detects the magnitude of the pressure at each position on the display surface 210 of the display unit 170 and takes the detected magnitude of the pressure as the detection value, and outputs the same to the mode-switch determination unit 120, the position calculation unit 130, and the timer unit 140.

The mode-switch determination unit 120 determines switching between the screen scroll process and the zoom rate change process for a display image based on the detection value of the detection unit 110 or the motion of the operating object. In the present embodiment, on detecting from the detection value of the detection unit 110 that the operating object is in contact with the display surface 210, the mode-switch determination unit 120 instructs the timer unit 140 to count the contact time of the operating object contacting the display surface 210. Also, the mode-switch determination unit 120 causes the position calculation unit 130 to calculate position area information that is used for mode-switch determination. The position area information here is a near area, a far area, the current contact position, or the like, for example. Additionally, specifying of the position area information will be described later. The mode-switch determination unit 120 estimates the operation process to be performed based on the time the operating object is in contact with the display surface 210 or the position area information, and causes, according to the estimation result, the scroll processing unit 150 or the zoom processing unit 160 to function.

The position calculation unit 130 calculates the contact position of the operating object and a set position of an area on the display surface 210. The position calculation unit 130 calculates, from the detection value of the detection unit 110, a reference contact position which is the contact position of the operating tool at the time of the operating tool contacting the display surface 210 after a state of separation from the display surface 210 or the current contact position of the operating object. The position calculation unit 130 also calculates an area position on the display surface 210 based on area setting information, stored in the storage unit 180, for specifying a near area and a far area. The position of the operating object or an area calculated by the position detection unit 130 is output to the mode-switch determination unit 120, and is recorded in the storage unit 180 as necessary.

The timer unit 140 counts the time the operating object is continuously in contact with the display surface 210. When the mode-switch determination unit 120 detects a new contact of the operating object on the display surface 210 from the detection value of the detection unit 110, an instruction for counting the contact time of the operating object is input from the mode-switch determination unit 120 to the timer unit 140. The timer unit 140 refers to the detection value of the detection unit 110, checks the contact state of the operating object on the display surface 210, and counts the contact time of the operating object. The timer unit 140 outputs the counted contact time of the operating object to the mode-switch determination unit 120. The timer unit 140 also counts the contact time of the operating object on the display surface 210 at the time of the zoom rate change process, according to an instruction from the zoom processing unit 160, and outputs the same to the zoom processing unit 160.

The scroll processing unit 150 performs display processing for causing a screen displayed on the display surface 210 to be scrolled according to the movement of the operating object. The scroll processing unit 150 functions in a case it is determined by the mode-switch determination unit 120, according to the movement of the operating object, that the screen scroll process is to be performed, and performs the display processing, according to the movement of the contact position of the operating object calculated by the position calculation unit 130, so as to scroll the screen displayed on the display surface 210. The scroll processing unit 150 outputs display information after the display processing to the display unit 170.

The zoom processing unit 160 performs the zoom rate change process for a display image displayed on the display surface 210, according to the movement of the operating object. The zoom processing unit 160 functions in a case it is determined by the mode-switch determination unit 120, according to the movement of the operating object, that the zoom rate change process for a display image is to be performed. The zoom processing unit 160 performs display processing, according to the movement of the contact position of the operating object calculated by the position calculation unit 130, the contact time of the operating object on the display surface 210 detected by the timer unit 140, or the like, so as to change the zoom rate of the display image displayed on the display surface 210. The zoom processing unit 160 outputs display information after the display processing to the display unit 170.

The display unit 170 is a function unit for displaying an object, such as text, an icon, or a figure, and a liquid crystal display, an organic electroluminescent display or the like may be used therefor, for example. In the present embodiment, the display surface side of the display unit 170 is provided with the detection unit 110, and a user can operate display contents of the display unit 170 by moving the finger F on the display surface 210, together with viewing the display contents of the display unit 170. Accordingly, the surface that a user makes the operating object contact is, to be exact, the surface of the detection unit 110, but, in the following, the surface that the operating object is made to contact in this manner is described in some cases as "the display surface 210 (of the display unit 170)."

The storage unit 180 stores position area information or threshold information that is used in the mode-switch determination process or the zoom rate change process. The storage unit 180 stores the area setting information for specifying a near area and a far area, the position area information calculated by the position calculation unit 130, a threshold time for switching from the screen scroll process to the zoom rate change process, and the like, for example. The storage unit 180 also stores the time during which zooming in or zooming out is consecutively performed in the zoom rate change process.

Figure 4:
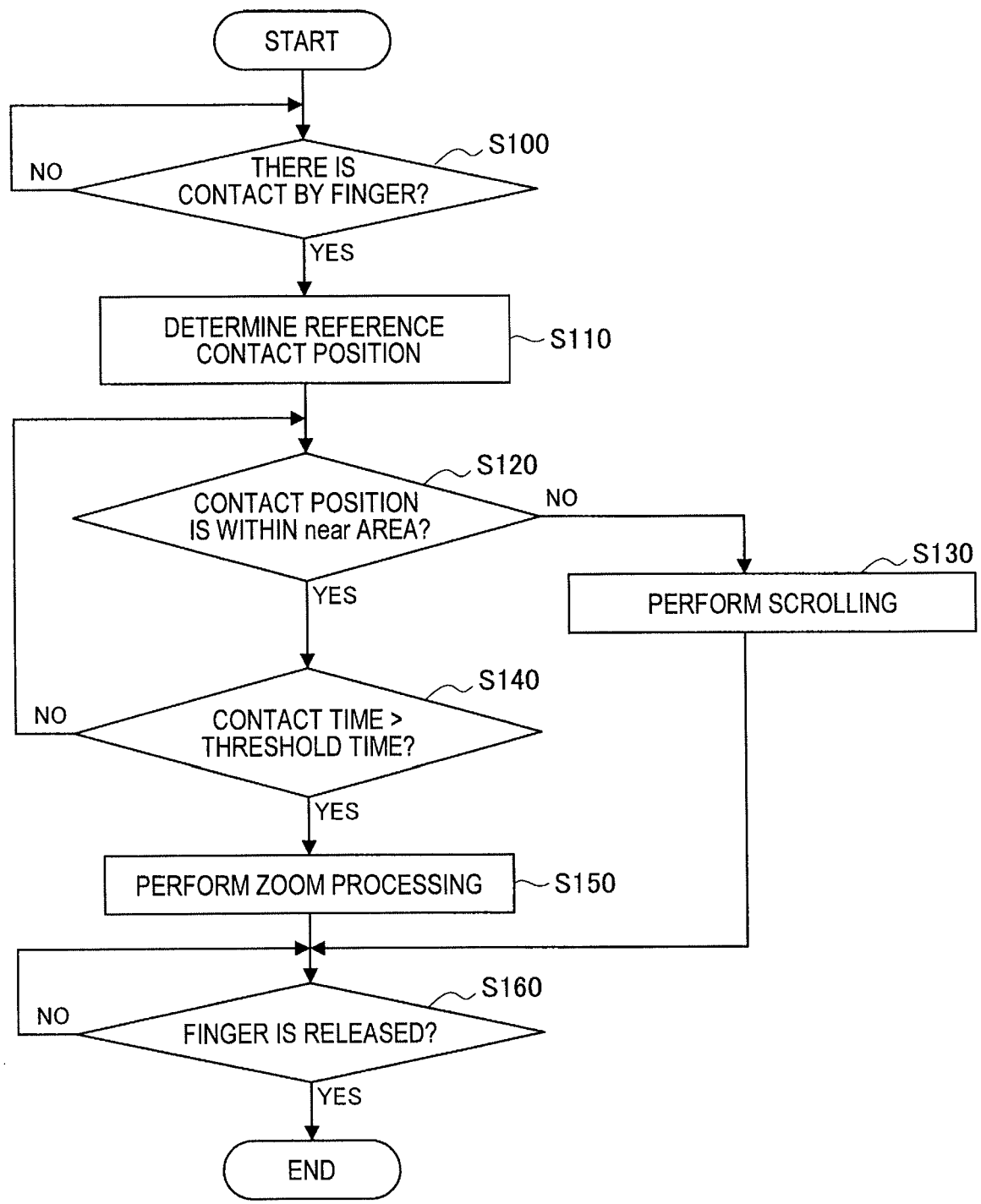
FIG. 4 is a flow chart showing a display control method of the display control device according to the embodiment.
Figure 5:
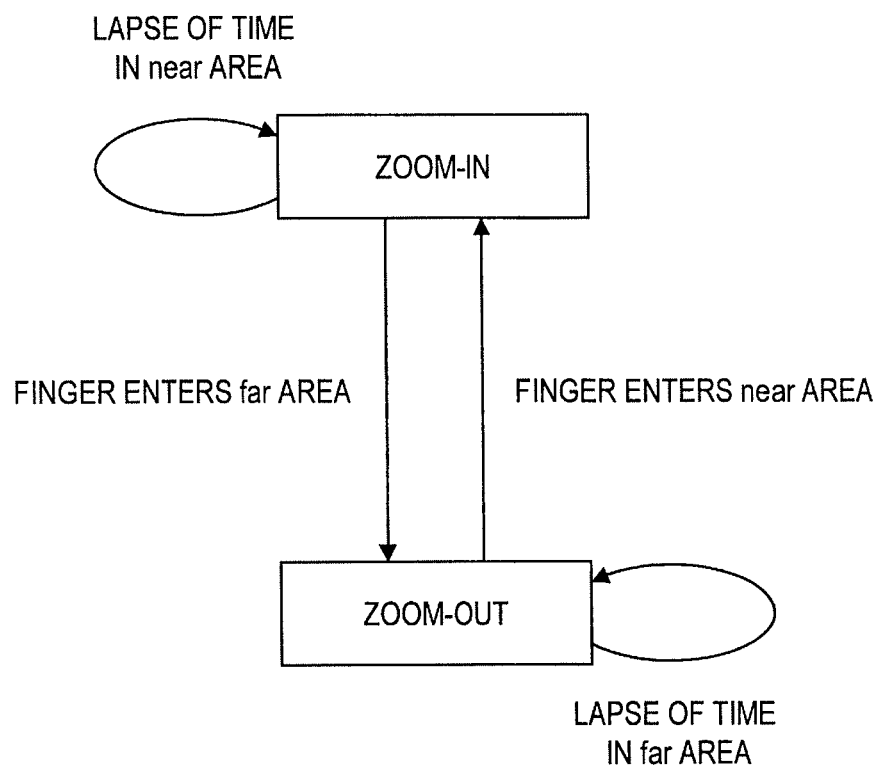
FIG. 5 is a flow diagram showing the zoom rate change process of the embodiment.
Figure 6:
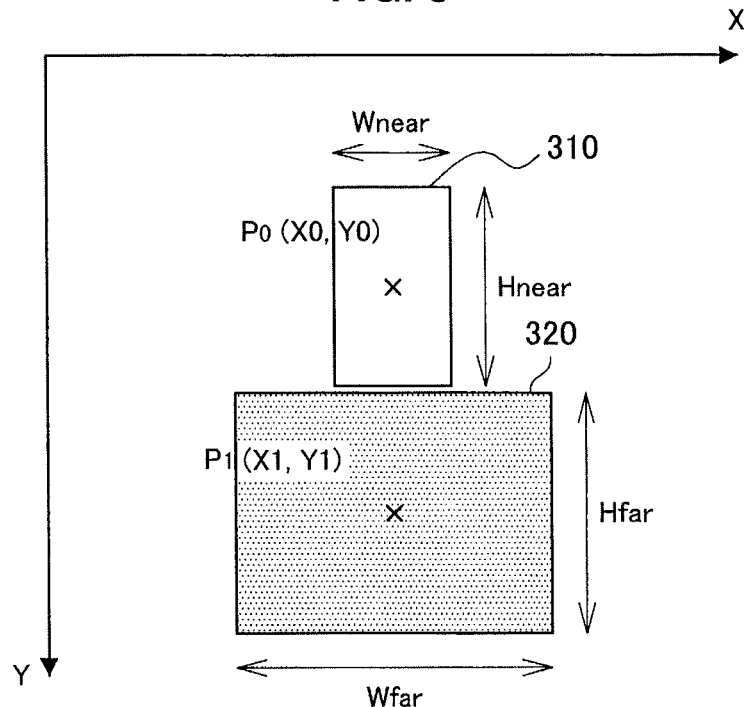
FIG. 6 is an explanatory diagram showing a near area and a far area specified within a display surface in a display control process.
Figure 7:
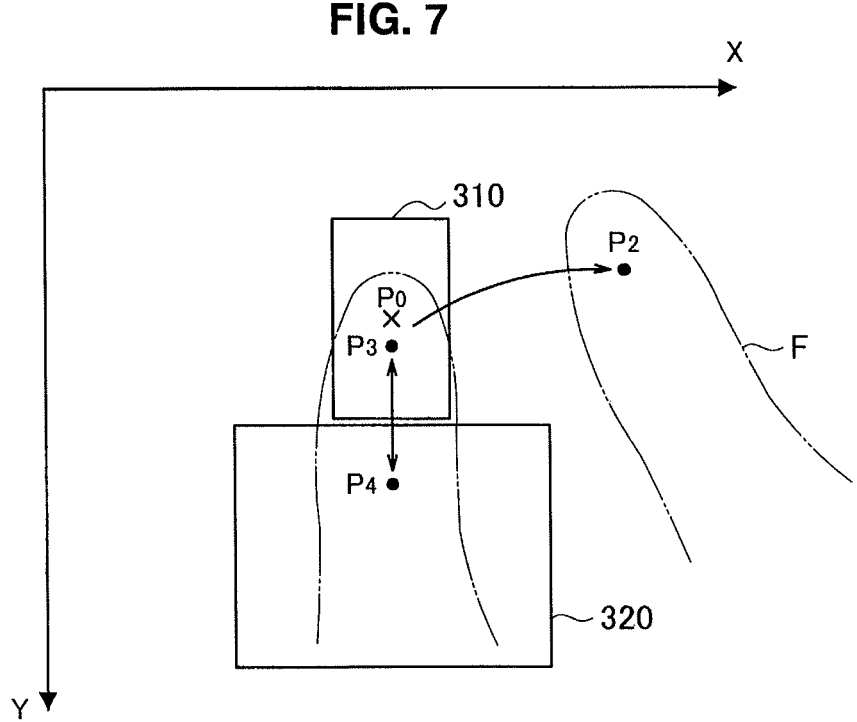
FIG. 7 is an explanatory diagram showing a relationship between movement of a finger F and the near area and the far area on the display surface.
Figure 8:
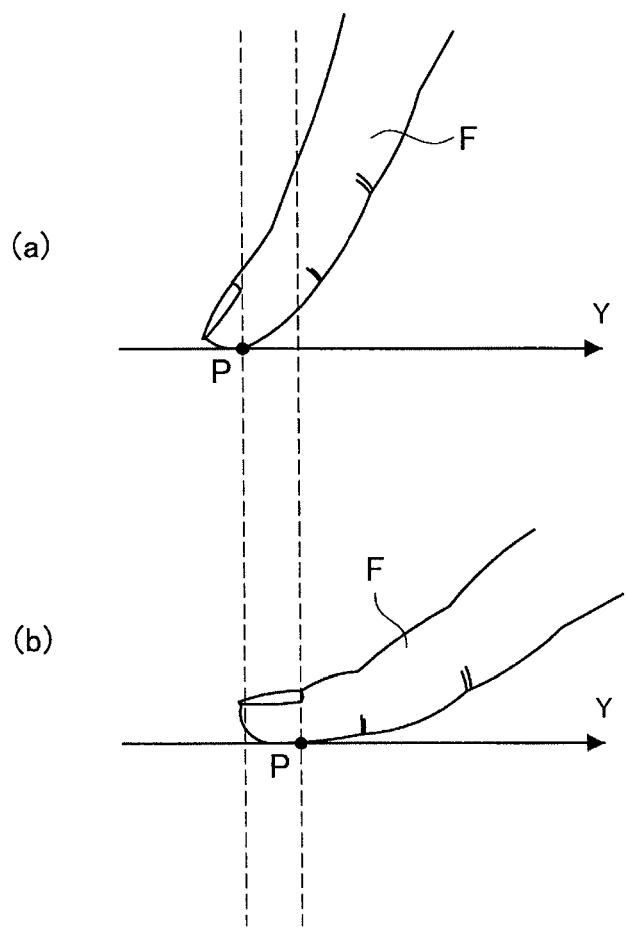
FIG. 8 is an explanatory diagram showing a relationship between the display surface and a contact position of the finger F depending on the inclination of the finger F.

In the foregoing, a functional configuration of the display control device 100 according to the present embodiment has been described. Next, a display control method of the display control device 100 according to the present embodiment will be described based on FIGS. 4 to 8. Additionally, FIG. 4 is a flow chart showing a display control method of the display control device 100 according to the present embodiment. FIG. 5 is a flow diagram showing the zoom rate change process of the present embodiment. FIG. 6 is an explanatory diagram showing a near area and a far area specified within the display surface 210 in the display control process. FIG. 7 is an explanatory diagram showing a relationship between the movement of the finger F and the near area and the far area on the display surface 210. FIG. 8 is an explanatory diagram showing a relationship between the display surface 210 and the contact position of the finger F depending on the inclination of the finger F.

[Display Control Method of Display Control Device]

By using the display control device 100 according to the present embodiment, both screen scrolling and changing of the zoom rate of a display image can be performed by a movement, such as a drag operation, of moving the finger F on the display surface 210. This is made possible by the mode-switch determination unit 120 determining which operation is to be performed depending on the contact time or the contact position of the finger F on the display surface 210. In the following, a mode-switch process for determining, according to the motion of the finger F, which operation process between screen scrolling and changing of the zoom rate is to function is first described, and then the zoom rate change process will be described.

(Mode-Switch Process)

In the mode-switch process, as shown in FIG. 4, whether or not an operating object such as the finger F is in contact with the display surface 210 is first determined by the mode-switch determination unit 120 of the display control device 100 (step S100). The mode-switch determination unit 120 repeats the process until contact of the finger F is detected by the detection unit 110. On the other hand, when contact of the finger F is detected by the detection unit 110, the mode-switch determination unit 120 decides as a reference contact position the contact position of the finger F at the time of the finger F being made to contact the display surface 210 after a state of separation from the display surface 210 (step S110).

The mode-switch determination unit 120 causes the position calculation unit 130 to calculate the reference contact position. The position calculation unit 130 identifies, from the detection value of the detection unit 110, the position on the display surface 210 that the finger F has contacted, and records the same in the storage unit 180 as the reference contact position. Here, when taking the display surface 210 as a XY-coordinate plane having an arbitrary point as the origin (0, 0), the reference contact position is made a position $P_0$ (X0, Y0) (see FIG. 6). Furthermore, the mode-switch determination unit 120 causes the timer unit 140 to record in the storage unit 180 a time point T0 which is when the finger F has contacted the display surface 210, together with the reference contact position.

When the reference contact position $P_0$ is decided in step S110, a near area and a far area are decided with respect to the reference contact position $P_0$ based on area setting information that is set in advance. The near area is a predetermined area including the reference contact position $P_0$, which is the contact position of the finger F at the time of the finger F contacting the display surface 210 after a state of separation from the display surface 210, and is an area where the movement of the position of the finger F in the near area is not considered the motion of the finger F. That is, it is an area where the finger F highly possibly moves without the user's intention, and it can also be said to be an area allowing an error. On the other hand, the far area is an area provided in the vicinity of the near area, and is provided in a direction of the position of the finger F moving from the near area due to the inclination of the finger F being changed. For example, as shown in FIG. 6, the far area can be provided in the positive Y-axis direction side with respect to the near area.

The positions of the near area and the far area can also be changed according to the use status of an appliance such as the mobile device 200. For example, in the case the mobile device 200 is rotated by 90 degrees, the near area and the far area are likewise rotated by 90 degrees. This can set the near area and the far area at appropriate positions according to the use status of the appliance. The relationship between the near area and the position of the finger F is used for mode-switch determination. Also, the near area and the far area are used for determining the increase/decrease of the zoom rate in the zoom rate change process.

The sizes and the shapes of the near area and the far area can be set in advance as the area setting information, and can be stored in the storage unit 180. The near area can be set to a size according to which a subtle movement of the finger F from the reference contact position $P_0$ will be included within the area but a motion of the finger F intended by the user will be outside the area. The size of the near area is normally decided depending on a device. On the other side, the far area can be set to be larger than the near area. The sizes or set positions of such near area and far area can also be set to average values of the users using the mobile device 200. Alternatively, each user may calibrate, before using the mobile device 200, a state where the finger is upright and a state where the finger is inclined, and set the sizes and set positions of the near area and the far area that are suitable to each user.

As shown in FIG. 6, a rectangular near area 310 and a far area 320 that are arranged adjacent to each other in the Y direction can be provided as the examples of the near area and the far area that are set. Additionally, the setting of the sizes and shapes of the near area and the far area shown in FIG. 6 are examples, and the present invention is not limited to such examples. For example, the size of the near area may be set to be smaller according to the capability of the device, and the shapes of the near area and the far area may be circular, oval, polygonal, or may be a shape according to the outline of the finger F, or the like.

Furthermore, in step S110, the position calculation unit 130 that calculates the reference contact position $P_0$ according to the instruction from the mode-switch determination unit 120 calculates $P_1$ that is calculated from the reference contact position $P_0$, the near area and the far area, together with setting the near area and the far area. The point $P_1$ (X1, Y1) is calculated by the following formula (1), and is recorded in the storage unit 180. Additionally, Hnear is the maximum length of the near area in the Y direction, and Hfar is the maximum length of the far area in the Y direction.

$$X1 = X0$$

$$Y1 = Y0 + H\text{near}/2 + H\text{far}/2 \quad \text{(Formula 1)}$$

Returning to FIG. 4, after deciding the reference contact position, the mode-switch determination unit 120 determines whether the current contact position of the finger F is within the near area or not (step S120). The mode-switch determination unit 120 determines whether the user has intentionally moved the finger F or not. Whether the current contact position of the finger F is within the near area or not can be determined based on whether the current contact position of the finger F P(X, Y) is positioned within the near area on the XY coordinates or not. Specifically, when taking the maximum length of the near area in the X direction as Wnear, for example, the contact position P can be determined to be positioned outside the near area 310 in the case either of (|X−X0|>Wnear/2) or (|Y−Y0|>Hnear/2) is satisfied.

In the case it is determined in step S120 that the contact position P is not positioned within the near area, the mode-switch determination unit 120 decides to perform the screen scroll process (step S130). At this time, the mode-switch determination unit 120 causes the scroll processing unit 150 to function and to perform processing to scroll the screen in accordance with the motion of the finger F. Display information which has been processed by the scroll processing unit 150 is output to the display unit 170, and is displayed.

On the other hand, in the case it is determined in step S120 that the contact position is within the near area, the mode-switch determination unit 120 determines whether the time of contact of the finger F on the display surface 210 has exceeded a threshold time or not (step S140). The mode-switch determination unit 120 acquires, by the timer unit 140, a time T that has elapsed since the finger F contacted the display surface 210, and compares the time T and a threshold time $T_{MAX}$ stored in the storage unit 180. Then, in the case the time T exceeds the threshold time $T_{MAX}$ (that is, in the case of $T > T_{MAX}$), the mode-switch determination unit 120 decides to perform the zoom rate change process for the display image (step S150). At this time, the mode-switch determination unit 120 causes the zoom processing unit 160 to function and to perform processing to change the zoom rate of the display image in accordance with the motion of the finger F. Display information which has been processed by the zoom processing unit 160 is output to the display unit 170, and is displayed. Additionally, the details of the zoom rate change process by the zoom processing unit 160 will be described later.

On the other hand, in the case it is determined in step S140 that the time T does not exceed the threshold time $T_{MAX}$ (that is, in the case of $T \leq T_{MAX}$), the mode-switch determination unit 120 returns to step S120, and repeats the process from step S120. Then, when execution of the screen scroll process is decided in step S130 or execution of the zoom rate change process for the display image is decided in step S150, display control is performed in the decided mode until the finger F is released from the display surface 210 (step S160). When release of the finger F from the display surface 210 is detected by the detection unit 110, the display control device 100 ends the display control shown in FIG. 4.

In the foregoing, the mode-switch process according to the present embodiment has been described. According to such mode-switch process, the reference contact position $P_0$ which is the contact position of the finger F at the time of the finger F being made to contact the display surface 210 after a state of separation from the display surface 210 is decided, and the near area is set with respect to the reference contact position $P_0$. Then, in the case the user dragged the finger F and moved the finger F to the outside of the near area, it is decided that the screen scroll process is intended by the user, and the mode-switch determination unit 120 causes the scroll processing unit 150 to function. For example, screen scrolling is performed in the case the contact position of the finger F moved from $P_0$ to $P_2$, as shown in FIG. 7. On the other hand, in the case the contact time of the finger F on the display surface 210 exceeds the threshold time while in a state the finger F is positioned within the near area by the user, it is decided that the zoom rate change process, not the screen scroll process, is intended by the user, and the mode-switch determination unit 120 causes the zoom processing unit 160 to function. For example, the zoom rate change process is performed in the case the contact position of the finger F does not get out of the near area for over the threshold time, as when the contact position of the finger F moves from $P_0$ to $P_3$, as shown in FIG. 7.

In this manner, which of the screen scroll process and the zoom rate change process for the display image that are associated with the drag operation is to be performed is decided according to the motion of the finger F after the contact of the finger F on the display surface 210. This enables to switch between operation processes with one finger. Also, according to the display control device 100 of the present embodiment, once the operation process is decided, the operation process by the drag operation is not changed until the user releases the finger F from the display surface 210. This can prevent reduction in the operability due to operation processes being frequently switched therebetween.

(Zoom Rate Change Process)

When the operation process by the drag operation of the finger F is uniquely decided by the mode-switch process described above, the decided operation process is performed until the finger F is released from the display surface 210. When execution of the screen scroll process is decided in the mode-switch process, the screen can be scrolled to a desired direction by moving the finger F up or down or left or right, as shown in FIG. 1, for example. On the other hand, also in the case the execution of the zoom rate change process is decided in the mode-switch process, the user can perform enlargement/reduction of the display image displayed on the screen by moving the finger F. As in the case of scrolling the screen, the operation of dragging the finger F can be associated with the operation process at this time, but it is also possible to associate a motion of the finger F, the relationship between which motion of the finger F and the operation content is high, with the process of changing the zoom rate.

Figure 10:
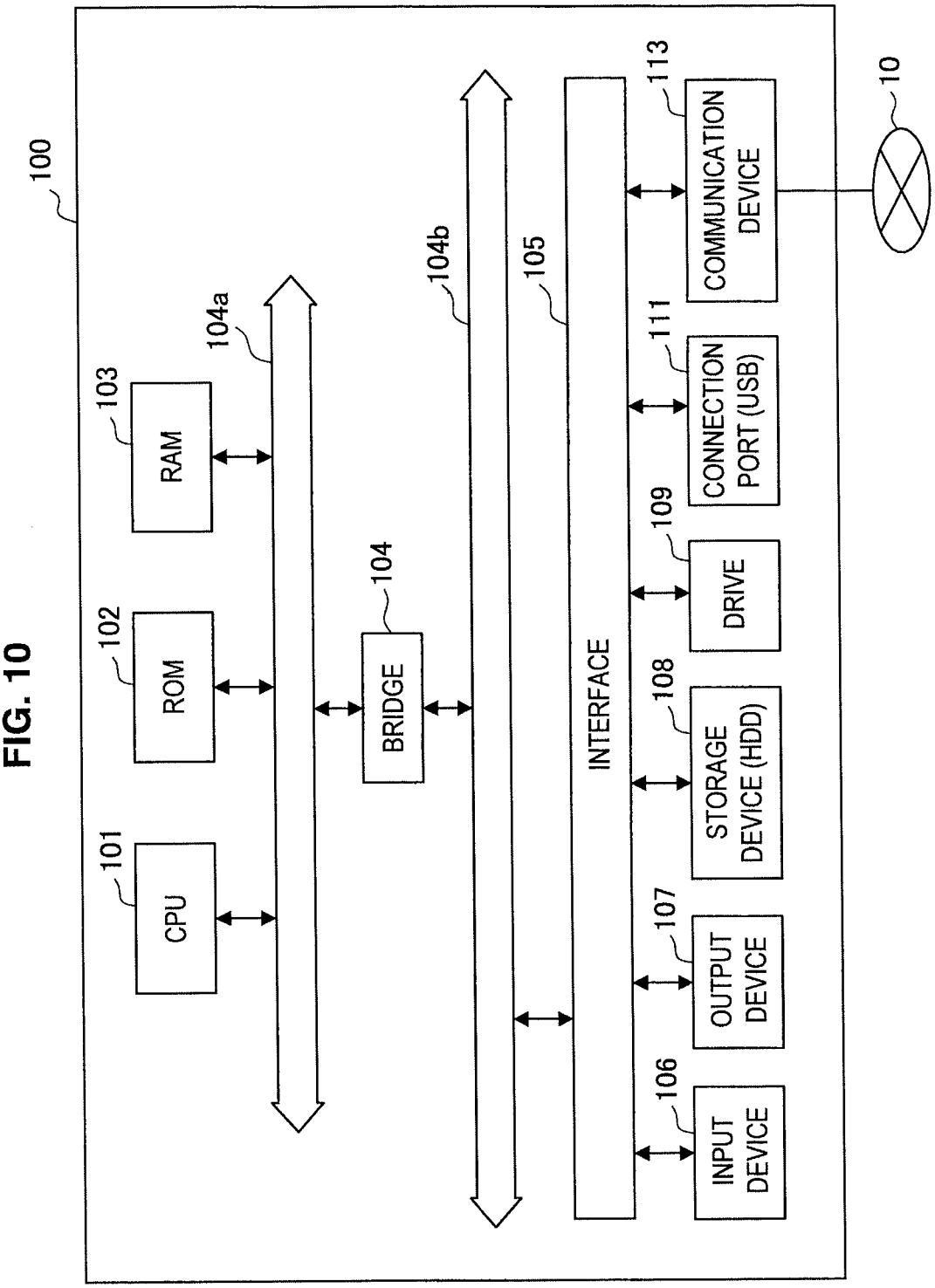
FIG. 10 is a hardware configuration diagram showing a configuration of the display control device.
Figure 11:
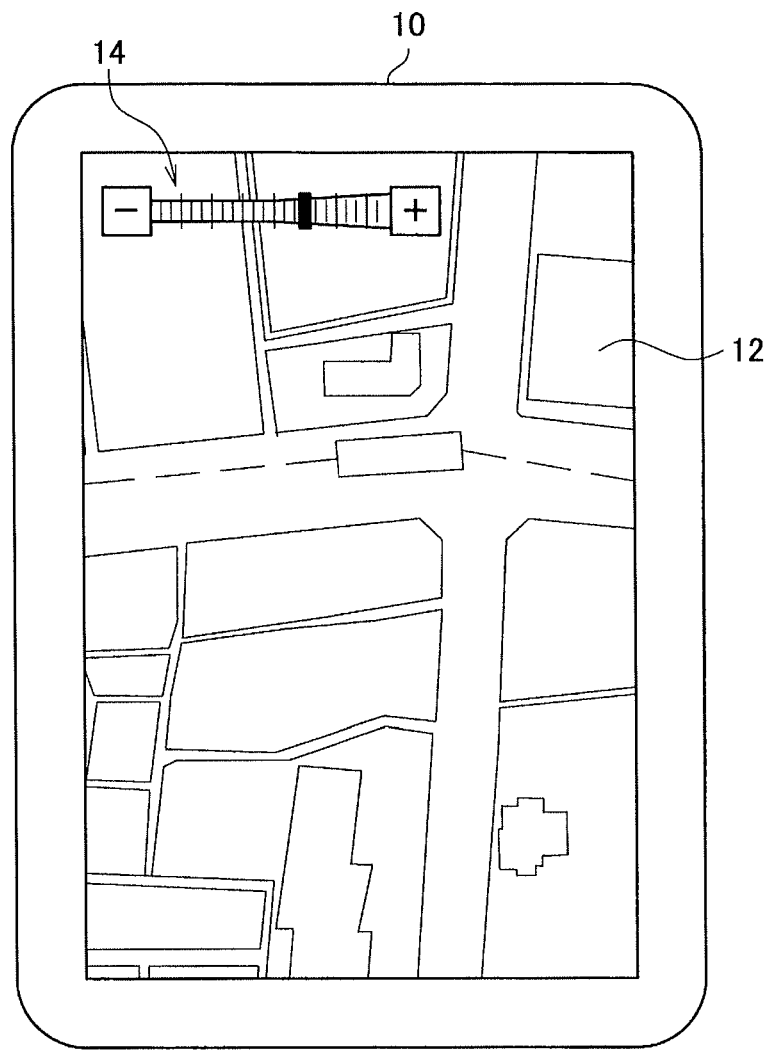
FIG. 11 is an explanatory diagram showing an operation with a traditional mobile device.

The display control device 100 according to the present embodiment enables to change the zoom rate by causing the contact position of the finger F to move on the display surface 210 between the near area and the far area. This allows also the zoom rate change process performed in step S150 of FIG. 4 to be subsequently performed by the finger F, which has performed mode-switching, without using the slider 14 displayed within the display screen as shown in FIG. 10. In the following, the zoom rate change process according to the present embodiment will be described based on FIGS. 5 to 8.

First, describing the operation of the finger F, according to the present embodiment, for changing the zoom rate, changing of the zoom rate is performed by moving the contact position of the finger F by pressing the finger F that is in contact with the display surface 210 in the direction of the finger tip or, on the contrary, tilting the finger F to the base side of the finger. For example, when the finger F is made to contact the display surface 210 while being upright as shown in FIG. 8(a), the contact position P of the finger F on the display surface 210 is on the side of the finger tip. On the other hand, in the case contact on the display surface 210 is made by the ball of the finger F as shown in FIG. 8(b), the contact position P of the finger F is positioned more on the negative Y-axis direction than the side of the finger tip when compared with the contact position P of the finger F that is upright as in FIG. 8(a).

In the present embodiment, changing of the zoom rate is performed using the property of the contact position that changes due to the finger F being made upright or made to tilt. Here, from the impressions of the operations, the operation of pressing the finger F in the direction of the finger tip is easily associated with the operation of enlarging the image, and the operation of tilting the finger F to the base side of the finger F is easily associated with the operation of reducing the image. Thus, the zoom rate is changed based on in which area of the near area and the far area the contact position of the finger F is positioned after the execution of the zoom rate change process is decided in step S150 of FIG. 4.

It is assumed that, in a state where the execution of the zoom rate change process is decided in step S150 of FIG. 4, the finger F is positioned within the near area. Thus, in such a state, the zoom processing unit 160 performs a zoom-in process of enlarging the display image. When the execution of the zoom-in process is started, the zoom processing unit 160 causes the timer unit 140 to count the time elapsed since the execution of the zoom-in process, and acquires the count value. The zoom processing unit 160 gradually increases the zoom rate as a predetermined time elapses in a state where the contact position of the finger F is within the near area. That is, as shown in FIG. 5, the zoom-in process is repeatedly performed by the zoom processing unit 160 until the finger F moved from the near area to the far area or the finger F is released from the display surface 210.

When it is detected from the calculation result of the position calculation unit 130 that the finger F has moved from the near area to the far area while the zoom-in process is being performed, the zoom processing unit 160 shifts the zoom-in process to a zoom-out process of reducing the display image. Whether the finger F has moved from the near area to the far area or not can be determined based on whether the current contact position of the finger F P(X, Y) is positioned within the far area on the XY coordinates or not. Specifically, when taking the maximum length of the far area in the X direction as Wfar, for example, the contact position P can be determined to be positioned in the far area 320 in the case both conditions ($|X-X1|>Wfar/2$) and ($|Y-Y1|>Hfar/2$) are satisfied.

When the execution of the zoom-in process is started, the zoom processing unit 160 causes the timer unit 140 to count the time elapsed since the execution of the zoom-out process, and acquires the count value. The zoom processing unit 160 gradually decreases the zoom rate as a predetermined time elapses in a state where the contact position of the finger F is within the far area. As shown in FIG. 5, the zoom-out process is repeatedly performed by the zoom processing unit 160 until the finger F moved from the far area to the near area or the finger F is released from the display surface 210.

Additionally, whether the finger F has moved from the far area to the near area or not can be determined based on whether the current contact position of the finger F P(X, Y) is positioned within the near area on the XY coordinates or not. Specifically, the contact position P can be determined to be positioned in the near area 310 in the case both conditions (|X−X0|>Wnear/2) and (|Y−Y0|>Hnear/2) are satisfied.

In this manner, the zoom rate can be changed also after the execution of the zoom rate change process is decided by the mode-switch determination unit 120, by the user changing the state of the finger F that is still in contact with the display surface 210 and moving the contact position P of the finger F. For example, as shown in FIG. 7, the zoom-in process is performed in a state where the contact position of the finger F is moving within the near area 310 as from the reference contact position $P_0$ to $P_3$. On the other hand, when the contact position of the finger F moves to a position such as $P_4$ in the far area 320 from the near area 310, the zoom-in process shifts to the zoom-out process, and the zoom rate of the display image is reduced. In this manner, by changing the contact position of the finger F by moving the finger F like a seesaw, the display image can be zoomed in or zoomed out.

Additionally, in the present embodiment, the zoom-in process is performed when the finger F is upright and the contact position of the finger F is positioned in the near area, and the zoom-out process is performed when the finger is tilted and the contact position of the finger F is in the far area, but the present invention is not limited to such an example. For example, the zoom-out process may be performed when the finger F is upright and the contact position of the finger F is positioned in the near area, and the zoom-in process may be performed when the finger F is tilted and the contact position of the finger F is positioned in the far area. Also, the manner of moving the contact position of the finger F on the display surface 210 can also be changed as appropriate depending on the positions of the near area and the far area. For example, in the case the near area and the far area are arranged adjacent to each other in the width direction of the finger F (the direction orthogonal to the direction from the finger tip to the base of the finger), the zoom-in process or the zoom-out process may also be performed by moving the contact position of the finger F by changing the inclination with respect to the width direction of the finger F.

In the foregoing, the display control device 100 according to the present embodiment and the display control method by the same have been described. According to the present embodiment, which operation process between the screen scroll process and the zoom rate change process for the display image is intended by the user can be estimated based on the movement state of the contact position of the finger F, and an operation process can be appropriately made to function. Also, the zoom rate change can be operated with one finger by causing the contact position of the finger F on the display surface to move. In this manner, by using the display control device 100 according to the present embodiment, the user is allowed to hold the mobile device 200 with one hand and to easily operate screen scrolling and zoom rate changing with one finger. Furthermore, since a GUI component for zoom rate change does not have to be displayed on the screen, a wider range of the display areas capable of displaying an image can be used as for image display.

2. Second Embodiment

Figure 9:
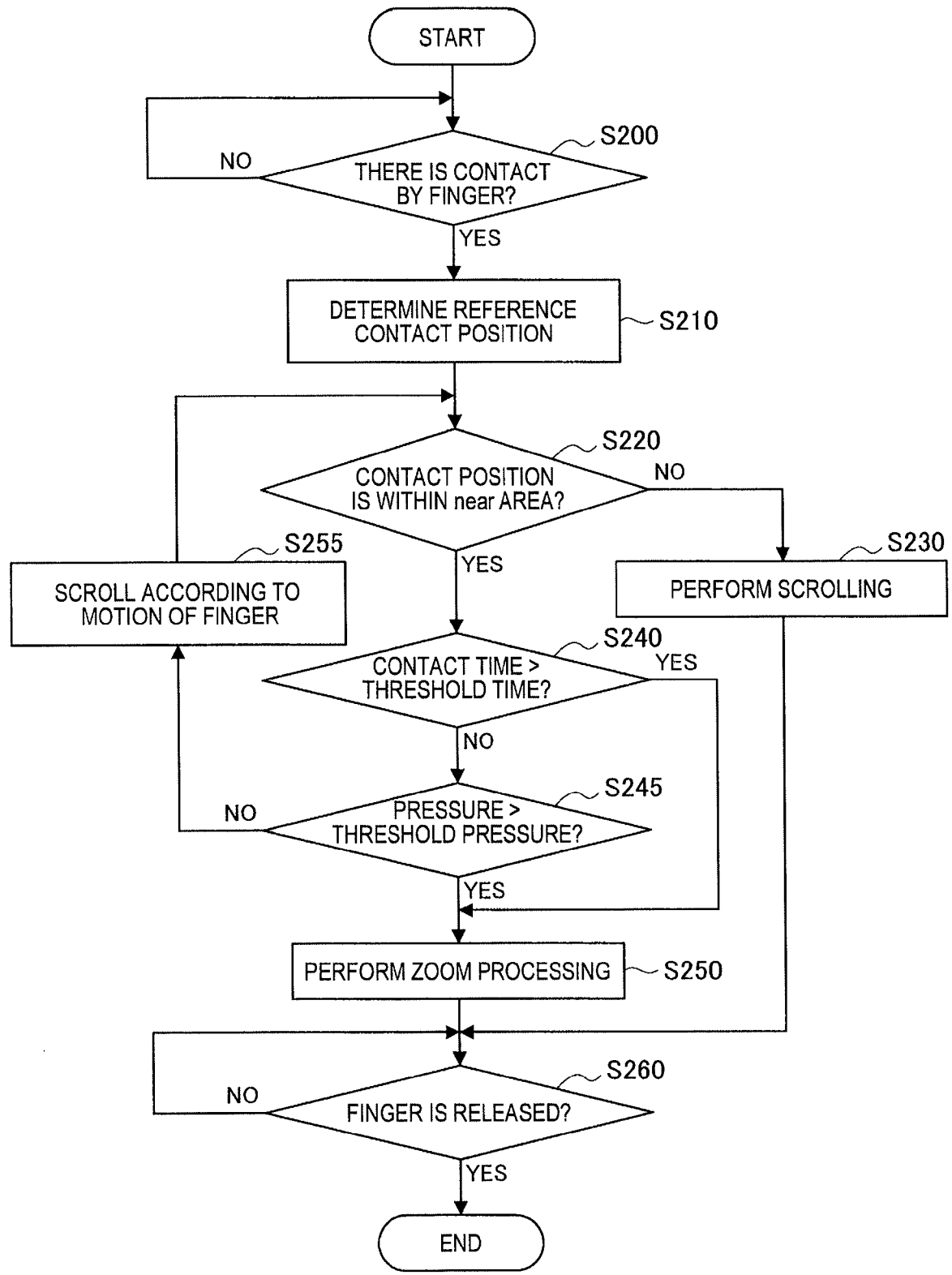
FIG. 9 is a flow chart showing a display control method of a display control device according to a second embodiment of the present invention.

Next, a display control method of a display control device according to the second embodiment of the present invention will be described based on FIG. 9. Additionally, FIG. 9 is a flow chart showing the display control method of the display control device according to the present embodiment. The configuration of the display control device of the present embodiment can be made the same as the display control device 100 according to the first embodiment, but there is a difference from the display control method of the first embodiment in that, in the mode-switch determination process, the magnitude of the pressure of the operating object pressing the display surface is taken into consideration, in addition to the elapsed time. In the following, the process different from the display control method of the first embodiment will be described in detail, and detailed explanation of the processes same as the first embodiment will be omitted.

(Mode Switch Process)

As shown in FIG. 9, also in the mode-switch process according to the present embodiment, the mode-switch determination unit 120 of the display control device 100 first determines whether an operating object such as the finger F is in contact with the display surface 210 or not (step S200). The mode-switch determination unit 120 repeats the process until contact by the finger F is detected by the detection unit 110. On the other hand, when contact of the finger F is detected by the detection unit 110, the mode-switch determination unit 120 decides as a reference contact position the contact position of the finger F at the time of the finger F being made to contact the display surface 210 after a state of separation from the display surface 210 (step S210). The mode-switch determination unit 120 causes the position calculation unit 130 and the timer unit 140 to calculate the time point T0 at which the finger F has contacted the display surface 210, the near area, the far area, and the point P1, together with the reference contact position, and records the same in the storage unit 180.

Then, after deciding the reference contact position, the mode-switch determination unit 120 determines whether the current contact position of the finger F is within the near area or not (step S220). In the case it is determined in step S120 that the contact position P is not positioned within the near area, the mode-switch determination unit 120 decides to perform the screen scroll process (step S230). At this time, the mode-switch determination unit 120 causes the scroll processing unit 150 to function and to perform processing to scroll the screen in accordance with the motion of the finger F. Display information which has been processed by the scroll processing unit 150 is output to the display unit 170, and is displayed.

Additionally, the process of steps S200 to S230 is the same process as the process of steps S100 to S130 described in the first embodiment.

On the other hand, in the case it is determined in step S220 that the contact position is within the near area, the mode-switch determination unit 120 determines whether the time of contact of the finger F on the display surface 210 has exceeded a threshold time or not (step S240). The process of step S240 is also the same as the process of step S140 described in the first embodiment. Then, in the case the time T exceeds the threshold time $T_{MAX}$ (that is, in the case of $T>T_{MAX}$), the mode-switch determination unit 120 decides to perform the zoom rate change process for the display image (step S250). At this time, the mode-switch determination unit 120 causes the zoom processing unit 160 to function and to perform processing to change the zoom rate of the display image in accordance with the motion of the finger F. Display information which has been processed by the zoom processing unit 160 is output to the display unit 170, and is displayed.

On the other hand, in the case it is determined in step S240 that the time T does not exceed the threshold time $T_{MAX}$ (that is, in the case of $T \le T_{MAX}$), the mode-switch determination unit 120 further determines whether the pressure of the finger F pressing the display surface 210 is higher that a threshold pressure or not (step S245). That is, in step S245, whether the user is pressing the finger F strongly against the display surface 210 or not is determined. The movement of pressing the finger F against the display surface 210 is considered to have a high relationship with an operation of enlarging the display image, and when the movement is performed, it can be estimated that the user is moving the finger F with the zoom-in process of the display image in mind. Thus, in the case the pressure of the finger F is higher than the threshold pressure in step S245, it is decided that the zoom rate change process is to be performed (step S250).

On the other hand, in the case the pressure of the finger F does not exceed the threshold pressure in step S245, it is estimated that the user is not moving the finger F with change of the zoom rate of the display image in mind. At this time, for example, the screen scroll process which is the other process associated with the drag operation of the finger F may be performed, and the screen may be scrolled according to the motion of the finger F within the near area (step S255). Then, the process from step S220 is repeated after returning to step S220.

Then, when execution of the screen scroll process is decided in step S230 or execution of the zoom rate change process for the display image is decided in step S250, display control is performed in the decided mode until the finger F is released from the display surface 210 (step S260). When release of the finger F from the display surface 210 is detected by the detection unit 110, the display control device 100 ends the display control shown in FIG. 9.

In the foregoing, the mode-switch process according to the present embodiment has been described. According to such mode-switch process, the reference contact position $P_0$ which is the contact position of the finger F at the time of the finger F being made to contact the display surface 210 after a state of separation from the display surface 210 is decided, and the near area is set with respect to the reference contact position $P_0$. Then, in the case the user dragged the finger F and moved the finger F to the outside of the near area, it is decided that the screen scroll process is intended by the user, and the mode-switch determination unit 120 causes the scroll processing unit 150 to function. On the other hand, in the case the contact time of the finger F on the display surface 210 exceeds the threshold time while in a state the finger F is positioned within the near area by the user or in the case the pressure of the finger F on the display surface exceeds the threshold pressure, it is decided that the zoom rate change process, not the screen scroll process, is intended by the user, and the mode-switch determination unit 120 causes the zoom processing unit 160 to function.

In this manner, which of the screen scroll process and the zoom rate change process for the display image that are associated with the drag operation is to be performed is decided according to the motion or pressure of the finger F after the contact of the finger F on the display surface 210. This enables to switch between operation processes with one finger. In the present embodiment, by deciding the magnitude of the pressure of the finger F on the display surface 210, shifting from the screen scroll process to the zoom rate change process can be performed more smoothly. Also, once the operation process is decided, the process operated by the drag operation does not change until the user releases the finger F from the display surface 210. This can prevent reduction in the operability due to operation processes being frequently switched therebetween.

Additionally, when an operation process is decided by the mode-switch process according to the present embodiment, the screen scroll process or the zoom rate change process shown in FIG. 5 is performed in accordance with the motion of the finger F, as in the first embodiment. Also, in the present embodiment, the mode-switch determination process is performed taking into account the magnitude of the pressure of the operating object pressing the display surface, in addition to the elapsed time, but the present invention is not limited to such an example, and the mode-switch determination process can also be performed taking into account only the pressure of the operating object pressing the display surface.

3. Hardware Configuration

The display control process of the display control device 100 according to the present embodiment can be performed by hardware or can be performed by software. In this case, a computer as shown in FIG. 10 is also included in the display control device 100. In the following, an example of the hardware configuration of the display control device 100 according to the present embodiment will be described based on FIG. 10. Additionally, FIG. 10 is a hardware configuration diagram showing the display control device 100 according to the present embodiment.

The display control device 100 of the present embodiment includes a CPU (Central Processing Unit) 101, a ROM (Read Only Memory) 102, a RAM (Random Access Memory) 103, and a host bus 104a. The display control device 100 also includes a bridge 104, an external bus 104b, an interface 105, an input device 106, an output device 107, a storage device (HDD) 108, a drive 109, a connection port 111, and a communication device 113.

The CPU 101 functions as an arithmetic processing unit and a control unit, and controls entire operation within the display control device 100 according to various programs. Also, the CPU 101 may be a microprocessor. The ROM 102 stores a program to be loaded on the CPU 101, operation parameters, and the like. The RAM 103 temporarily stores a program used in the execution of the CPU 101, parameters arbitrarily changed in the execution, or the like. These are connected to each other by the host bus 104a configured from a CPU bus or the like.

The host bus 104a is connected to the external bus 104b such as a PCI (Peripheral Component Interconnect/Interface) bus via the bridge 104. Additionally, the host bus 104a, the bridge 104, and the external bus 104b do not necessarily have to be separately configured, and these functions may be implemented in a single bus.

The input device 106 is configured from input means for a user to input information, such as a mouse, a keyboard, a touch panel, a button, a microphone, a switch, and a lever, an input control circuit for generating an input signal based on input from the user and outputting the same to the CPU 101, and the like. The user of the display control device 100 can input various data or command a processing operation to the display control device 100 by operating the input device 106. In the present embodiment, the input device 106 is configured from a touch panel and the like as the detection unit 110 of FIG. 3.

The output device 107 includes a display device such as a CRT (Cathode Ray Tube) display device, a liquid crystal display (LCD) device, an OLED (Organic Light Emitting Diode) device or a lamp, for example. Furthermore, the output device 107 includes an audio output device such as speakers or headphones. In the present embodiment, the display unit 170 is provided as the output device 107, as shown in FIG. 3.

The storage device 108 is a device for storing data configured as an example of the storage unit of the display control device 100. The storage device 108 may include a storage medium, a recording device that records data in the storage medium, a read-out device that reads data from the storage medium, a deleting device that deletes data recorded in the storage medium, or the like. The storage device 108 is configured from an HDD (Hard Disk Drive), for example. This storage device 108 drives a hard disk, and stores a program to be executed by the CPU 101 or various data.

The drive 109 is a reader/writer for a storage medium, and is built in or externally attached to the display control device 100. The drive 109 reads information recorded on a removable recording medium attached thereto, such as a magnetic disk, an optical disk, a magneto-optical disk, or a semiconductor memory, and outputs the same to the RAM 103.

The connection port 111 is an interface to be connected to an external appliance, and is a connection to an external appliance that is capable of data transmission via a USB (Universal Serial Bus) or the like, for example. Also, the communication device 113 is a communication interface configured from a communication device or the like for connecting to a communication network 15, for example. Furthermore, the communication device 112 may be a wireless LAN (Local Area Network)-compatible communication device, a wireless USB-compatible communication device, or a wired communication device that performs communication by wire.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

For example, in the above-described embodiments, an example is shown where the operations of screen scrolling and changing of the zoom rate of a display image are performed taking a map as an example, but the present invention is not limited to such an example. For example, a similar process can be applied to a document, a photograph, or the like, for example. According to the present invention, two operations regarding one object, namely, screen scrolling and changing of the zoom rate of a display image, can be consecutively performed with one finger.

The invention claimed is:

1. A display control device comprising:
   a detection unit for detecting contact of an operating object on a display surface of a display unit;
   a position calculation unit for calculating a contact position, on the display surface, of the operating object whose contact has been detected by the detection unit;
   an operation process determination unit for determining, from a plurality of operation processes associated with a single gesture-type motion of the operating object, one operation process to be performed, according to a length of a contact time of continuously contacting the display surface prior to moving the operating object in the gesture motion, the continuous contact occurring within a first area of the display surface including a reference contact position which is a contact position of the operating object at a time of the operating object being made to initially contact the display surface after a state of separation from the display surface; and
   an operation processing unit for changing display of the display unit by the operation process that is performed, based on a motion of the operating object that is further continuously in contact with the display surface through completion of the gesture motion,
   wherein the single gesture-type motion of the operating object is associated with a plurality of different operation processes, and the one operation process to be performed is determined based on the length of the contact time of the operating object being in a state of continuously contacting the display surface within the first area prior to the moving of the operating object in the gesture motion, and
   wherein the detection unit, the position calculation unit, the operation process determination unit, and the operation processing unit are each implemented via at least one processor.

2. The display control device according to claim 1,
   wherein the operation processing unit includes
      a scroll processing unit for scrolling a screen displayed on the display unit according to a movement of the contact position of the operating object on the display surface, and
      a level-of-detail processing unit for changing a level of detail of display content displayed on the display unit according to a movement of the contact position of the operating object on the display surface, and
   wherein, in a case of determining that the contact time of the operating object within the first area has exceeded the threshold time, the operation process determination unit causes the level-of-detail processing unit to function.

3. The display control device according to claim 2,
   wherein, in a case of determining that the contact position of the operating object is positioned outside the first area, the operation process determination unit causes the scroll processing unit to function.

4. The display control device according to claim 2,
   wherein the detection unit is capable of detecting a pressure imposed by the operating object on the display surface, and
   wherein, in a case the detected pressure is higher than a threshold pressure, the operation process determination unit causes the level-of-detail processing unit to function.

5. The display control device according to claim 4,
   wherein, in a case the contact time of the operating object within the first area does not exceed the threshold time and the detected pressure is not higher than the threshold pressure, the operation process determination unit causes the scroll processing unit to function.

6. The display control device according to claim 2,
   wherein the position calculation unit calculates a position on the display surface with respect to the first area and a second area provided adjacent to the first area in a movable direction of the operating object, and
   wherein the level-of-detail processing unit changes the level of detail of the display content according to which area of the first area or the second area the contact position of the operating object is positioned in.

7. The display control device according to claim 6,
wherein the level-of-detail processing unit
increases the level of detail of the display content in a case the operating object is positioned within the first area, and
decreases the level of detail of the display content in a case the operating object is positioned within the second area.

8. The display control device according to claim 1,
wherein, after one operation process to be performed is decided by the operation process determination unit, the operation processing unit changes display of the display unit by the operation process that is performed, based on a motion of the operating object, until separation of the operating object from the display surface is detected by the detection unit.

9. A display control method comprising the steps of:
detecting, by a detection unit, contact of an operating object on a display surface of a display unit;
calculating a contact position, on the display surface, of the operating object whose contact has been detected by the detection unit;
determining, from a plurality of operation processes associated with a single gesture-type motion of the operating object, one operation process to be performed, according to a length of a contact time of continuously contacting the display surface prior to moving the operating object in the gesture motion, the continuous contact occurring within a first area of the display surface including a reference contact position which is a contact position of the operating object at a time of the operating object being made to initially contact the display surface after a state of separation from the display surface; and
changing display of the display unit by the operation process that is performed, based on a motion of the operating object that is further continuously in contact with the display surface through completion of the gesture motion,
wherein the single gesture-type motion of the operating object is associated with a plurality of different operation processes, and the one operation process to be performed is determined based on the length of the contact time of the operating object being in a state of continuously contacting the display surface within the first area prior to the moving of the operating object in the gesture motion.

10. A non-transitory computer-readable medium having embodied thereon a program, which when executed by a computer causes the computer to perform a method, the method comprising:
detecting, by a detection unit, contact of an operating object on a display surface of a display unit;
calculating a contact position, on the display surface, of the operating object whose contact has been detected by the detection unit;
determining, from a plurality of operation processes associated with a single gesture-type motion of the operating object, one operation process to be performed, according to a length of a contact time of continuously contacting the display surface prior to moving the operating object in the gesture motion, the continuous contact occurring within a first area of the display surface including a reference contact position which is a contact position of the operating object at a time of the operating object being made to initially contact the display surface after a state of separation from the display surface; and
changing display of the display unit by the operation process that is performed, based on a motion of the operating object that is further continuously in contact with the display surface through completion of the gesture motion,
wherein the single gesture-type motion of the operating object is associated with a plurality of different operation processes, and the one operation process to be performed is determined based on the length of the contact time of the operating object being in a state of continuously contacting the display surface within the first area prior to the moving of the operating object in the gesture motion.

* * * * *